Figure 1:
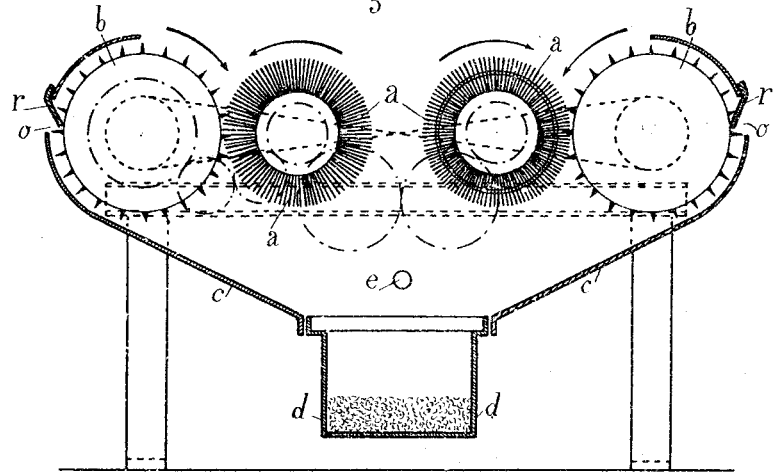

C. P. BARY.
PROCESS OF TREATING AUTOMOBILE TIRES AND OTHER LIKE ARTICLES FOR SEPARATING THE RUBBER AND FABRIC.
APPLICATION FILED JULY 8, 1914.

1,182,071. Patented May 9, 1916.

Witnesses:
René Muine
T. T. Wallac

Inventor:
Charles Paul Bary
By Attorneys,
Fraser, Tink & Myers

UNITED STATES PATENT OFFICE.

CHARLES PAUL BARY, OF PARIS, FRANCE, ASSIGNOR TO HENRY PIERRE CHARLES GEORGES DEBAUGE, OF PARIS, FRANCE.

PROCESS OF TREATING AUTOMOBILE-TIRES AND OTHER LIKE ARTICLES FOR SEPARATING THE RUBBER AND FABRIC.

1,182,071.     Specification of Letters Patent.     Patented May 9, 1916.

Application filed July 8, 1914. Serial No. 849,718.

*To all whom it may concern:*

Be it known that I, CHARLES PAUL BARY, of Paris, France, have invented certain new and useful Improvements in and Relating to Processes of Treating Automobile-Tires and other like Articles for Separating the Rubber and Fabric, of which the following is a specification.

This invention relates to the removal of the fabric or like support from automobile tires and other articles of vulcanized rubber.

The object of this invention is to provide an improved process for the removal of the fabric or like support from automobile tires and other articles of vulcanized rubber.

In those industries in which old rubber is used over again, the operation of removing the fabric therefrom is always very troublesome and sometimes impossible by any other means than treatment by acids. This treatment possesses several serious disadvantages, such as the complete destruction of the fabric, which, although it is so much waste, possesses a substantial value. Furthermore the treatment by acids has the defect of nearly always leaving traces of acid in the rubber, the extraction completely by washing with water being exceedingly difficult.

The improved process which forms the subject matter of this invention is based upon and characterized by the property which vulcanized rubber possesses of absorbing certain liquids such as the hydrocarbons, the chlor-derivatives thereof, carbon disulfid, chloroform, etc., in considerable quantity, thereby enabling the volume to be increased from two, three up to five times according to the rubber operated upon and its degree of vulcanization. The vulcanized rubber thus swollen up, instead of being tough as it was before having absorbed one of the liquids above specified, becomes friable; furthermore if it has been cemented to fabrics or other materials which are not changed by the bath in which the rubber has been soaked, the elastic and swollen up portion of the whole separates very easily from its support, fabric or other material, preferably by brushing.

Figure 2:
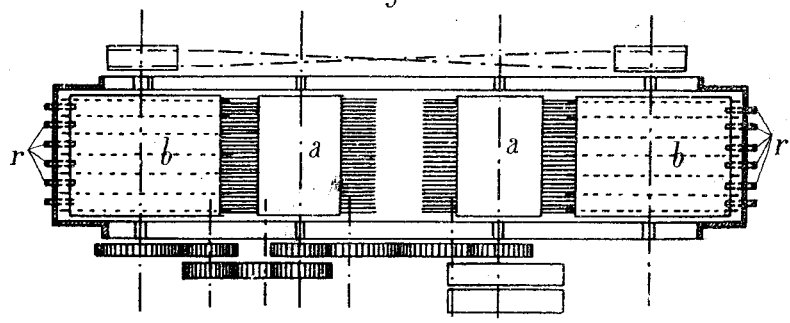

To enable the process to be understood, there may be taken as an example the very frequent case of the removal of the fabric from the smooth pneumatic tires of automobiles or bicycles. The pneumatic tires are placed in soak in vats containing xylol for example, for two or three days. According to the quantity of liquid employed in proportion to the quantity of pneumatic tires subjected to treatment and according to the quality of these pneumatic tires, that is to say the quantity of soluble substances which they contain (such as resins, tar, paraffin or ceresin, free sulfur, etc.) it may be advisable to change the liquid once or twice during the operation, if it be seen that it is becoming too highly charged with foreign substances. After this period of soaking it will be seen that the rubber portion comes away and breaks up with extreme facility, which permits of the fabrics being removed one by one without any effort and without injuring these latter, which thus retain a marketable value which is not negligible. The fabrics are however still covered on both sides with the rubber cement which has served to attach them to the rubber sections. To remove this solution which is a substance worth recovering, in consequence of its quality, the fabrics must be brushed, preferably by the aid of metal brushes which almost completely remove the whole of the rubber therefrom. In practice this brushing can be carried out under excellent conditions by means of small machines of the kind similar to that represented diagrammatically in the accompanying drawings:

Referring to the drawings, Figure 1 is an elevation in longitudinal section of one form of apparatus used in accordance with this invention. Fig. 2 is a plan of the same.

This machine, which is shown by way of example, has two combined units, each comprising a revolving brush $a$ of round or flat metal wires of iron or steel, and a drum $b$ covered with points which serve to carry around the fabrics to be brushed. A casing $c$ covers in the base of this mechanical portion and terminates in a drawer, $d$, arranged to receive the powdered rubber detached by the brushes.

The arrows indicate the direction of rotation of the various brushes and revolving cylinders. It will be seen that the diameters of the brushes and the feed drums are different in order to produce the brushing action required for the fabrics which are passed in between a brush $a$ and the corresponding drum $b$, the brushes revolving more rapidly than the drums with their feeding points.

The casing $c$ has openings $o$ for the exit of the fabrics after they have been brushed and freed from the rubber, springs $r$ compelling the said fabrics to become detached from the drums $b$ which have carried them around. In this way therefore the rubber may be thoroughly separated from the fabric of the pneumatic tires or other articles of rubber.

Care will have to be taken to carry on these operations in a very cool place and not to leave the materials exposed to the air except for the least possible time necessary so that there may be only little evaporation of the xylol or other liquid employed. On the other hand a current of air may be set up in all those places where evaporation may take place and the xylol or other liquid thus carried off and condensed. In the machine shown diagrammatically, a current of air may be set up in the casing $c$ through the opening $e$.

With regard to the xylol or other liquid which remains contained in the rubber and in the fabrics, after the treatment which has just been described, it can be removed in a current of steam. By subsequently condensing the vapors the xylol and the water are recovered and since the two substances are not miscible with each other they can consequently be easily separated.

According to the object in view it may be found advantageous to profit by the state of distention of the rubber as has been explained above, to reduce it to powder, which operation can be carried out with extreme ease, for example in grinding machines with sandstone rollers. The evaporation of the xylol contained in the rubber powder thus obtained, if this evaporation be necessary, is carried out as above described in a current of steam.

Instead of carrying out the evaporation of the xylol by means of a current of steam, it may also be effected by simple distillation under reduced pressure or even at atmospheric pressure without fear of deterioration of the material.

It is also possible not to have recourse to the evaporation of the xylol or other product employed in the treatment described by soaking the swollen rubber in a substance which is a good solvent of xylol but is not absorbed by the rubber such as acetone or alcohol.

The dry material of rubber in powder thus obtained is nothing more than the original rubber freed from free sulfur, resins, tar, hydrocarbons, oils and all soluble substances which are added to natural rubber for the manufacture therefrom of vulcanized articles of commerce. This rubber is therefore by this simple treatment in the cold, in a state of purity which is much superior to that which it possessed before such treatment. It may consequently be employed for the manufacture of articles made from regenerated rubber.

Claims:

1. A process for the removal of vulcanized rubber from composite rubber and fabric articles, such as pneumatic tires, comprising steeping the articles in xylol and allowing the rubber to absorb the xylol, lose its toughness, to swell and become friable and to become easily separable from the fabric in the condition of a friable jelly.

2. A process for the removal of vulcanized rubber from composite rubber and fabric articles, such as pneumatic tires, comprising steeping the articles in xylol and allowing the rubber to absorb the xylol, lose its toughness, to swell and become friable and to become easily separable from the fabric in the condition of a friable jelly, separating the rubber and fabric, and brushing the fabric to remove the adherent portions of rubber and cement.

3. A process for the removal of vulcanized rubber from composite rubber and fabric articles, such as pneumatic tires, comprising steeping the articles in xylol and allowing the rubber to absorb the xylol, lose its toughness, to swell and become friable and to become easily separable from the fabric in the condition of a friable jelly, separating the rubber and fabric, and brushing the fabric to remove the adherent portions of rubber and cement, said operations being carried out in a current of air charged with the vapor of the xylol.

4. A process for the removal of vulcanized rubber from composite rubber and fabric articles, such as pneumatic tires, comprising steeping the articles in xylol and allowing the rubber to absorb the xylol, lose its toughness, to swell and become friable and to become easily separable from the fabric in the condition of a friable jelly and evaporating the xylol from the rubber and fabric in a current of steam.

5. A process for the removal of vulcanized rubber from composite rubber and fabric articles, such as pneumatic tires, comprising steeping the articles in xylol and allowing the rubber to absorb the xylol, lose its toughness, to swell and become friable and to become easily separable from the fabric in the condition of a friable jelly, and comminuting the rubber in the swollen friable state.

6. A process for the removal of vulcanized rubber from composite rubber and fabric articles, such as pneumatic tires, comprising steeping the articles in xylol and allowing the rubber to absorb the xylol, lose its toughness, to swell and become friable and to become easily separable from the fabric in the condition of a friable jelly, and extracting the xylol from the rubber fabric by a solvent of the xylol.

In witness whereof, I have hereunto signed my name in the presence of two subscribing witnesses.

CHARLES PAUL BARY.

Witnesses:
 CHAS. P. PRESSLY,
 RENÉ BARDY.